(12) United States Patent
Jadot et al.

(10) Patent No.: US 9,428,634 B2
(45) Date of Patent: Aug. 30, 2016

(54) ORGANOSILOXANE COMPOSITIONS

(75) Inventors: Emmanuel Jadot, Jemeppe-sur-Sambre (BE); Patrick Vandereecken, Court-Saint-Etienne (BE)

(73) Assignee: DOW CORNING CORPORATION, Midland, MI (US)

( * ) Notice: Subject to any disclaimer, the term of this patent is extended or adjusted under 35 U.S.C. 154(b) by 0 days.

(21) Appl. No.: 14/002,924

(22) PCT Filed: Mar. 2, 2012

(86) PCT No.: PCT/EP2012/053620
§ 371 (c)(1),
(2), (4) Date: Sep. 3, 2013

(87) PCT Pub. No.: WO2012/119940
PCT Pub. Date: Sep. 13, 2012

(65) Prior Publication Data
US 2013/0338289 A1    Dec. 19, 2013

(30) Foreign Application Priority Data

Mar. 4, 2011 (GB) .................................. 1103689.4

(51) Int. Cl.
| | |
|---|---|
| C08K 9/04 | (2006.01) |
| C08K 3/26 | (2006.01) |
| C09D 183/04 | (2006.01) |
| C08G 77/16 | (2006.01) |
| C08L 71/02 | (2006.01) |
| C08L 83/04 | (2006.01) |

(52) U.S. Cl.
CPC .................. *C08K 9/04* (2013.01); *C08G 77/16* (2013.01); *C08K 3/26* (2013.01); *C08L 71/02* (2013.01); *C08L 83/04* (2013.01); *C09D 183/04* (2013.01)

(58) Field of Classification Search
CPC ......... C08G 77/18; C08G 77/16; C08K 3/26
USPC ........................................................ 524/858
See application file for complete search history.

(56) References Cited

U.S. PATENT DOCUMENTS

| | | | |
|---|---|---|---|
| 4,962,152 | A | 10/1990 | Leempoel |
| 5,840,794 | A | 11/1998 | Palmer |
| 5,948,854 | A | 9/1999 | de Buyl et al. |
| 6,114,438 | A | 9/2000 | Lower |
| 6,235,832 | B1 | 5/2001 | Deng et al. |
| 8,703,866 | B2 | 4/2014 | Iwasaki et al. |
| 2005/0192387 | A1 | 9/2005 | Williams et al. |
| 2006/0194067 | A1* | 8/2006 | Beger ............ C08L 83/04 428/447 |
| 2007/0219297 | A1 | 9/2007 | Nishiumi et al. |
| 2007/0276085 | A1 | 11/2007 | Iwasaki et al. |
| 2009/0042043 | A1 | 2/2009 | Joseph et al. |
| 2010/0152373 | A1* | 6/2010 | Wakabayashi et al. ...... 524/588 |
| 2010/0225069 | A1 | 9/2010 | Haas et al. |
| 2010/0249308 | A1 | 9/2010 | Oba |

FOREIGN PATENT DOCUMENTS

| | | |
|---|---|---|
| CA | 2 003 089 | 5/1990 |
| EP | 0400439 A2 | 12/1990 |
| EP | 0543615 A1 | 5/1993 |
| EP | 0802233 A2 | 10/1997 |
| EP | 2221342 A1 | 8/2010 |
| GB | 2445821 A | 7/2008 |
| JP | H 02-189365 A | 7/1990 |
| JP | H 03-041157 A | 2/1991 |
| JP | H 10-212409 A | 8/1998 |
| JP | H10-330630 A | 12/1998 |
| JP | H 11-181287 A | 7/1999 |
| JP | 2002-533518 A | 10/2002 |
| JP | 2003-119385 A | 4/2003 |
| JP | 2006-316212 A | 11/2006 |
| JP | 2007-526945 A | 9/2007 |
| JP | 2007-327045 A | 12/2007 |
| JP | 2002-533518 A | 6/2010 |
| WO | WO 2004/094503 A1 | 11/2004 |
| WO | WO 2006/106362 A1 | 10/2006 |
| WO | WO 2007/009871 A2 | 1/2007 |
| WO | 2008 099858 * | 8/2008 |

OTHER PUBLICATIONS

English language abstract and machine-assisted English translation for JP H10-330630 extracted from the PAJ database on Feb. 28, 2014, 30 pages.

English language abstract and machine-assisted English translation for JP 2006-316212 extracted from the PAJ database on Feb. 28, 2014, 21 pages.

English language abstract and machine-assisted English translation for JP 2007-327045 extracted from the PAJ database on Feb. 28, 2014, 33 pages.

(Continued)

*Primary Examiner* — Kuo-Liang Peng

(74) *Attorney, Agent, or Firm* — Howard & Howard Attorneys PLLC

(57) ABSTRACT

A one or more component moisture cure Organosiloxane composition that has strength in an uncured state (commonly referred to in the industry as "green strength") and its uses. The composition comprises an organopolysiloxane polymer having a viscosity of at least 1000 mPa·s at 25° C. and not less than two silicon-bonded hydroxyl groups and/or silicon bonded hydrolysable groups; a suitable catalyst; a crosslinker adapted to react with organopolysiloxane polymer when catalysed with the catalyst; and optionally one or more rheology modifiers and 0 to 10% by weight of the composition of one or more extenders or plasticisers but in particular the composition contains a precipitated calcium carbonate filler in an amount of from 50 to 70 weight % of the total composition.

19 Claims, No Drawings

(56) References Cited

OTHER PUBLICATIONS

International Search Report for Application No. PCT/EP2012/053620 dated Apr. 4, 2012, 4 pages.
English language abstract not found for JPH 02-189365; however, see English language equivalent CA 2,003,089. Original document extracted from espacenet.com database on Jan. 4, 2016, 6 pages.
English language abstract not found for JPH 03-041157; however, see English language equivalent U.S. Pat. No. 4,962,152. Original document extracted from espacenet.com database on Jan. 4, 2016, 12 pages.
English language abstract for JPH 10-212409 extracted from espacenet.com database on Jan. 4, 2016, 1 page.
English language abstract for JPH 11-181287 extracted from espacenet.com database on Jan. 4, 2016, 1 page.
English language abstract not found for JP 2002-533518; however, see English language equivalent U.S. Pat. No. 6,235,832. Original document extracted from espacenet.com database on Jan. 4, 2016, 46 pages.
English language abstract and machine-assisted English translation for JP 2003-119385 extracted from espacenet.com database on Jan. 4, 2016, 21 pages.
English language abstract not found for JP 2007-526945; however, see English language equivalent U.S. 2005/0192387. Original document extracted from espacenet.com database on Jan. 4, 2016, 17 pages.
English language abstract for JP 2010-126575 extracted from espacenet.com database on Jan. 4, 2016, 12 pages.

* cited by examiner

ORGANOSILOXANE COMPOSITIONS

RELATED APPLICATIONS

This application is the National Stage of International Patent Application No. PCT/EP2012/053620, filed on Mar. 2, 2012, which claims priority to and all the advantages Of Great Britain Patent Application No. GB 1103689.4, filed on Mar. 4, 2011, the content of which is incorporated herein by reference.

This concerns the development of a one or more component, moisture cure Organosiloxane composition that has strength in an uncured state (commonly referred to in the industry as "green strength") and its uses.

Organosiloxane compositions, which cure to elastomeric solids, are well known. Typically, such compositions are obtained by mixing a polydiorganosiloxane having reactive terminal groups, e.g. hydroxy groups or hydrolysable groups, with e.g. a silane cross-linking agent which is reactive with the polydiorganosiloxane, for example an acetoxy silane, an oximosilane, an aminosilane or an alkoxysilane in the presence of a suitable catalyst. The resulting compositions are curable upon exposure to atmospheric moisture at room temperature.

One important application of the above-described curable compositions is their use as adhesives and/or sealants. In use as sealants, it is important that a composition is capable of curing in comparatively thick layers to provide an elastomeric body having a thickness greater than about 2 mm. It is frequently desirable that the organopolysiloxane composition cures quickly enough to provide a sound seal within several hours but not so quickly that the surface cannot be tooled to desired configuration shortly after application.

Among specifically desirable attributes for such compositions are fast surface cure rate, good elasticity of the skin formed and lack of surface tackiness after curing for about 24 hours. However, such a sealant is applied onto a substrate at room temperature and is designed to take at least several hours before the bond between the sealant/adhesive and a substrate reaches its condition of ultimate strength, i.e. they do not cure fast enough immediately after application onto a substrate to form a sufficient green strength for applications requiring strong initial bonds between the sealant/adhesive and the substrate. "Green strength" as defined herein means the strength of the sealant used in an assembled construction before the sealant has fully cured and "Ultimate strength" as discussed henceforth is the adhesive strength after the chemical cure is essentially complete.

In certain applications which utilize sealant in e.g. assembly line applications, it is necessary to use a sealant which can rapidly develop green strength. Sealants which rapidly develop green strength have the advantage of allowing the sealant user to handle, package and ship the assembled construction after relatively shorter cure times without damage to the assembled construction, thus increasing production line.

Several methods to introduce these high green strength properties into organopolysiloxane compositions for use as adhesives and/or sealants have been proposed/utilized in the industry. These have tended to involve the use of additives which require the composition to be applied onto a target at elevated temperatures and rely on the characteristics of additives to provide an initial green strength to the composition as the temperature returns to room temperature. Examples include silicone sealant compositions containing a silicone resin that is molten at the time of the application or using a silicone based hot melt composition containing reactive and/or un-reactive hot melt materials such as polyisobutylenes and additives such as suitable waxes. Other silicone sealants providing initial green strength contain polymeric materials typically referred to as tackifiers, however these tend to be organic and have poor compatibility with organopolysiloxane compositions such as those described herein and may result in negatively affecting the physical properties of cured elastomers prepared therefrom.

Whilst the inclusion of such additional ingredients to the basic chemical composition do add significant benefits, they also significantly increase the cost of the product to the consumer and necessitate the use of elevated temperatures during application of the composition in the form of e.g. a sealant or adhesive. Hence, there is a need in the industry to seek alternative compositions which provide the user with similar if not improved green strength as compared to prior art materials available on the market having good green strength without the need for these additives and elevated temperatures during use.

The inventors have unexpectedly identified composition having an excellent green strength behaviour whilst avoiding the need for expensive and complicated additives and mixtures.

In accordance with the present invention there is provided a room temperature curable organopolysiloxane composition which has strength in an uncured state comprising:
a) an organopolysiloxane polymer having a viscosity of at least 1000 mPa·s at 25° C. and not less than two silicon-bonded hydroxyl groups and/or silicon bonded hydrolysable groups
b) a precipitated calcium carbonate filler
c) a suitable catalyst
d) a cross-linker adapted to react with component (a), catalysed with component (c) and optionally
e) one or more rheology modifiers and
f) 0 to 10% by weight of the composition of one or more extenders or plasticisers
wherein component b) is present in an amount of from 50 to 70 weight % of the total composition.

For the avoidance of doubt when measured in weight % the total weight % of the composition is 100%.

One significant advantage of the present composition is that contrary to the prior art the composition is room temperature vulcanisable (i.e. an RTV) and therefore can be applied and cured at room temperature e.g. temperatures of from 15 to 25° C. It is particularly useful to avoid the need for application of the composition at elevated temperatures of e.g. 80° C. and above (for example 80° C. to 200° C.) which is the case when using hot-melt based compositions in order to obtain initial green strength, because of the danger to operatives and the need for additional heating steps prior to application which in turn introduce additional cost and safety issues. Whilst elevated temperatures e.g. greater than 25° C. (for example 30° C. to 75° C.) may be utilised for cure, such elevated temperatures are generally unnecessary and not preferred. Hence, the composition in accordance with the present invention is room temperature applicable as well as an RTV unlike prior art hot melt based compositions.

Preferably the organopolysiloxane polymer having a viscosity of at least 1000 mPa·s at 25° C. is a polysiloxane based polymer containing at least two hydroxyl or hydrolysable groups, most preferably the polymer comprises terminal hydroxyl or hydrolysable groups. Preferably the polymer has the general formula:

$$X\text{-}A\text{-}X^1 \quad (1)$$

where X and $X^1$ are independently selected from siloxane groups which terminate in hydroxyl or hydrolysable groups and A is a siloxane containing polymeric chain.

Examples of hydroxyl-terminating or hydrolysable groups X or $X^1$ include —Si(OH)$_3$, —(R$^a$)Si(OH)$_2$, —(R$^a$)$_2$SiOH, —R$^a$Si(OR$^b$)$_2$, —Si(OR$^b$)$_3$, —(R$^a$)$_2$SiOR$^b$ or —(R$^a$)$_2$Si—R$^c$—Si(R$^d$)$_p$(OR$^b$)$_{3-p}$ where each R$^a$ independently represents a monovalent hydrocarbyl group, for example, an alkyl group, in particular having from 1 to 8 carbon atoms, (and is preferably methyl); each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to six silicon atoms; and p has the value 0, 1 or 2. Preferably X and/or $X^1$ contain hydroxyl groups or groups which are otherwise hydrolysable in the presence of moisture.

Examples of suitable siloxane groups A in formula (I) are those which comprise a polydiorgano-siloxane chain. Thus group A preferably includes siloxane units of formula (2)

$$—(R^5{}_sSiO_{(4-s)/2})— \quad (2)$$

in which each $R^5$ is independently an organic group such as an optionally substituted hydrocarbyl group having from 1 to 10 carbon atoms. For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups. In the present case $R^5$ may, for example, be optionally substituted with one or more halogen group such as chlorine or fluorine and s is 0, 1 or 2.

Particular examples of groups $R^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl) ethyl or chlorocyclohexyl group. Suitably, at least some and preferably substantially all of the groups $R^5$ are methyl.

Group A in the compound of formula (1) may include any suitable siloxane or siloxane/organic molecular chain providing the resulting polymer a viscosity (in the absence of diluents in accordance with the present invention of up to 20 000 000 mPa·s, at 25° C. (i.e. up to or even more than 200 000 units of formula (2)). In one preferred embodiment A is a linear organopolysiloxane molecular chain (i.e. s =2) for all chain units. Preferred materials have polydiorganosiloxane chains according to the general formula (3)

$$—(R^5{}_2SiO)_t— \quad (3)$$

in which each $R^5$ is as defined above and is preferably a methyl group and t has a value of up to 200 000. Suitable polymers have viscosities of up to or more than 20 000 000 mPa·s at 25° C. but are generally in the range of 1000 to 100 000 mPa·s at 25° C. Alternatively the polymer has a viscosity of 5000 to 50000 mPa·s at 25° C. All viscosity measurements were made at 25° C. using a Brookfield LV DV-E viscosimeter unless otherwise indicated.

Preferred polysiloxanes containing units of formula (2) are thus polydiorganosiloxanes having terminal, silicon-bound hydroxyl groups or terminal, silicon-bound organic radicals which can be hydrolysed using moisture as defined above. The polydiorganosiloxanes may be homopolymers or copolymers. Mixtures of different polydiorganosiloxanes having terminal condensable groups are also suitable.

Component (b) is one or more precipitated calcium carbonate (PCC) fillers. The inventors have identified that unexpectedly using high levels of precipitated calcium carbonate (PCC) fillers provides such compositions with strength in an uncured state (green strength). The PCC fillers are either pre-treated or treated in-situ with treating agents such as organochlorosilanes, organopolysiloxanes, and hexaalkyldisilazanes. Alternatively the fillers are either pre-treated or treated in-situ with treating agents such as fatty acids such as stearic acid or their derivatives e.g. stearates. The surface treatment of the fillers makes the filler easily wetted by the silicone polymer. These surface modified fillers do not clump, and can be homogeneously incorporated into the silicone polymer.

In one alternative PCC fillers treated with fatty acids or their derivatives are utilised. The PCC filler is present in the composition in a range of from 50 to 75% weight of the total composition, alternatively 55 to 70% weight of the total composition.

Component (c) of the composition may be any suitable condensation catalyst. These may include condensation catalysts containing metals such as tin, lead, antimony, iron, cadmium, barium, manganese, zinc, chromium, cobalt, nickel, aluminium, gallium or germanium and zirconium. Examples include organic tin metal catalysts such as alkyltin ester compounds such as Dibutyltin dioctoate, Dibutyltin diacetate, Dibutyltin dimaleate, Dibutyltin dilaurate, butyltin 2-ethylhexoate. 2-ethylhexoates of iron, cobalt, manganese, lead and zinc may alternatively be used. Titanate and/or zirconate based catalysts are preferred. Such titanates may comprise a compound according to the general formula:

$$Ti[OR]_4$$

where each R may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of R include but are not restricted to methyl, ethyl, propyl, isopropyl, butyl, tertiary butyl and a branched secondary alkyl group such as 2,4-dimethyl-3-pentyl. Preferably, when each R is the same, R is an isopropyl, branched secondary alkyl group or a tertiary alkyl group, in particular, tertiary butyl.

Alternatively, the titanate/zirconate is chelated. The chelation may be with any suitable chelating agent such as an alkyl acetylacetonate such as methyl or ethylacetylacetonate.

Preferably the catalyst, component (c), will be present in an amount of from about 0.1 to 3 weight % of the composition. Component (c) may be present in an amount of greater than 3 weight % in cases where chelating agents are used.

Component (d) is a suitable silane or short chain organopolysiloxane having at least two and preferably three or more hydroxyl and/or otherwise hydrolysable groups which are reactable with component (a). The hydrolysable groups in Component (d) may comprise acyloxy groups (for example, acetoxy, octanoyloxy, and benzoyloxy groups); ketoximino groups (for example dimethyl ketoximo, and isobutylketoximino); alkoxy groups (for example methoxy, ethoxy, an propoxy) and alkenyloxy groups (for example isopropenyloxy and 1-ethyl-2-methylvinyloxy).

In the case of siloxane based cross-linkers the molecular structure can be straight chained, branched, or cyclic.

When the crosslinker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic group is methyl.

Hence, component (d) in the first aspect of the invention may comprise a silane substantially having the formula $G_x$-Si-$R_{4-x}$, Each group G may be the same or different and is reactable with the hydroxyl or hydrolysable groups. Examples of preferred G groups may be selected from the group of alkoxy, acetoxy, oxime and hydroxy groups as described above. Most preferably the reactable groups are alkoxy groups containing between 1 and 10 carbon atoms such as methoxy, ethoxy, propoxy, isoproproxy, butoxy, and t-butoxy groups. Each R group is the same or different and independently represents an alkyl group having from 1 to 10 carbon atoms, an alkenyl group, an alkynyl group an aryl group such as phenyl, or a fluorinated alkyl group. Preferably, the R group is selected from an alkyl, a linear or branched alkenyl group such as vinyl, propenyl isopropenyl and hexenyl groups or alkynyl group. The value of x may be 2, 3 or 4 but is typically 3 or 4 most usually 3.

Silanes and siloxanes which can be used as crosslinkers include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyltripropionoxysilane, methyltris(methylethylketoximo) silane, vinyl-tris-methylethylketoximo)silane, methyltris (methylethylketoximino)silane, methyltris(isopropenoxy) silane, vinyltris(isopropenoxy)silane, ethylpolysilicate, n-propylorthosilicate, ethylorthosilicate, dimethyltetraacetoxydisiloxane, alkenyl alkyl dialkoxysilanes such as vinyl methyl dimethoxysilane, vinyl ethyldimethoxysilane, vinyl methyldiethoxysilane, vinylethyldiethoxysilane, alkenylalkyldioximosilanes such as vinyl methyl dioximosilane, vinyl ethyldioximosilane, vinyl methyldioximosilane, vinylethyldioximosilane, alkenylalkyldiacetoxysilanes such as vinyl methyl diacetoxysilane, vinyl ethyldiacetoxysilane, vinyl methyldiacetoxysilane, vinylethyldiacetoxysilane and alkenylalkyldihydroxysilanes such as vinyl methyl dihydroxysilane, vinyl ethyldihydroxysilane, vinyl methyldihydroxysilane, vinylethyldihydroxysilane. The cross-linker used may also comprise any combination of two or more of the above.

A sufficient amount of component (d) is employed to ensure adequate stability of the composition during storage and adequate inter-reaction with component (a) of the composition when exposed to atmospheric moisture. Component (d) is present in an amount of from 1 to 10% weight of the total composition. Alternatively Component (d) is present in an amount of from 1.5 to 7.0 weight % of the composition. Alternatively, component (d) is present in an amount of from 2 to 6 weight % of the composition.

Component (e) The rheological additives may be silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide (EO) and propylene oxide (PO), and silicone polyether copolymers; as well as carboxylated liquid polyolefins such as carboxylated liquid butadienes and silicone glycols. Fumed silica may also be used in small amounts to act as component (e).

Optional component (f) is present in an amount of from 0 to 10% weight of the total composition alternatively 0.1 to 10% weight of the total composition, alternatively from 1 to 7.5% weight of the total composition of a plasticiser or low volatility extender.

A plasticiser (otherwise referred to as a primary plasticiser) is added to a polymer composition to provide properties within the final polymer based product to increase the flexibility and toughness of the final polymer composition. This is generally achieved by reduction of the glass transition temperature ($T_g$) of the cured polymer composition thereby generally, in the case of sealants for example, enhancing the elasticity of the sealant which in turn enables movement capabilities in a joint formed by a silicone sealant with a significant decrease in the likelihood of fracture of the bond formed between sealant and substrate when a sealant is applied thereto and cured. Plasticisers are typically used to also reduce the modulus of the sealant formulation. Plasticisers may reduce the overall unit cost of a sealant but that is not their main intended use and indeed some plasticisers are expensive and could increase the unit cost of a sealant formulation in which they are used. Plasticisers tend to be generally less volatile than extenders and are typically introduced into the polymer composition in the form of liquids or low melting point solids (which become miscible liquids during processing. Typically, for silicone based composition plasticisers are organopolysiloxanes which are unreactive with the siloxane polymer of the composition, such as polydimethylsiloxane having terminal triorganosiloxy groups wherein the organic substituents are, for example, methyl, vinyl or phenyl or combinations of these groups. Such polydimethylsiloxanes normally have a viscosity of from about 5 to about 100 000 mPa·s at 25° C. Compatible organic plasticisers may additionally be used, examples include dialkyl phthalates wherein the alkyl group may be linear and/or branched and contains from six to 20 carbon atoms such as dioctyl, dihexyl, dinonyl, didecyl, diallanyl and other phthalates; adipate, azelate, oleate and sebacate esters, polyols such as ethylene glycol and its derivatives, organic phosphates such as tricresyl phosphate and/or triphenyl phosphates, castor oil, tung oil, fatty acids and/or esters of fatty acids.

An extender (sometimes also referred to as a process aid or secondary plasticiser) is used to dilute the sealant composition and basically make the sealant more economically competitive without substantially negatively affecting the properties of the sealant formulation. The introduction of one or more extenders into a silicone sealant composition not only reduces the overall cost of the product but can also affect the properties of resulting uncured and/or cured silicone sealants.

The addition of extenders can, to a degree, positively affect the rheology, adhesion and clarity properties of a silicone sealant and can cause an increase in elongation at break and a reduction in hardness of the cured product both of which can significantly enhance the lifetime of the cured sealant provided the extender is not lost from the cured sealant by, for example, evaporation or exudation. The choice of extenders is very important, typically when present in an uncured composition it is intended that the extender be retained within the cured elastomeric product produced after cure and hence, particularly in the case of organopolysiloxane based compositions high volatility extenders e.g. solvents such as toluene or xylene or alkanes having 1 to 8 carbon atoms are to be avoided because the high volatility of these compounds causes a number of disadvantages in sealant formulations including, high shrinkage (high volume loss due to evaporation of the solvent), flammability, VOC (volatile organic content), hazardous component labelling, health and safety issues, etc.

Specific examples include a polydimethyl siloxane having terminal triorganosiloxy groups wherein the organic substituents are e.g. methyl, vinyl or phenyl or combinations thereof. Such polydimethylsiloxanes normally have a viscosity of from about 100 to about 100 000 mPa·s at 25° C. Extenders may include any of the extenders described in WO 2006/106362, for example, petroleum distillates such as linear or branched mono unsaturated hydrocarbons such as linear or branched alkenes or mixtures thereof containing at least 12, e.g. from 12 to 25 carbon atoms; and/or mineral oil fractions comprising linear (e.g. n-paraffinic) mineral oils, branched (iso-paraffinic) mineral oils, cyclic (referred in some prior art as naphthenic) mineral oils and mixtures thereof.

When present, component (f) may be introduced into pre-prepared component (a) along with the other ingredients of the composition or alternatively may be added to the starting materials (oligomers) prior to polymerisation of polymer (a) such that polymer (a) is prepared in a diluted form containing component (f) in which form it is mixed with the other ingredients of the composition.

Hence the composition of the present invention may comprise the following amounts of each component discussed above:

From 20 to 45% by weight of component (a)
From 1 to 10% by weight of component (d),
From 50 to 70% by weight of component (b),
From 0.1 to 3% by weight of component (c)
From 0 to 5% by weight of component (e),
From 0 to 10% plasticiser or extender (f) but may also include additional additives providing, of course, that compositions in accordance with the present invention when given in values of weight % add up to 100% weight in total.

Examples of additional additives which may be included in the compositions, include are pigments, extenders and/or plasticisers, photoinitiators, and adhesion promoters, heat stabilizers, Flame retardants, UV stabilizers, Chain extenders, electrically and/or heat conductive fillers, Fungicides and/or biocides and the like water scavengers, (typically the same compounds as those used as cross-linkers or silazanes). It will be appreciated that some of the additives are included in more than one list of additives. Such additives would then have the ability to function in all the different ways referred to.

Additional fillers may be present in an amount 0 to 20% weight of the composition but preferably the total amount of filler present (i.e. the total amount of component (b) and the additional filler is 70% weight of the total composition. Additional fillers may include non-reinforcing fillers such as crushed quartz, diatomaceous earths, barium sulphate, iron oxide, titanium dioxide and carbon black, talc, wollastonite, aluminite, calcium sulphate anhydrite, gypsum, calcium sulphate, magnesium carbonate, clays such as kaolin, aluminium trihydroxide, magnesium hydroxide e.g. brucite, graphite, copper carbonate, e.g. malachite, nickel carbonate, e.g. zarachite, barium carbonate, e.g. witherite and/or strontium carbonate e.g. strontianite Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$.

The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3.2SiO_2$; kyanite; and $Al_2SiO_5$. The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

The additional fillers may also be treated using the same treating agents as described above in relation to component (b).

Any suitable adhesion promoter(s) may be incorporated in a sealant composition in accordance with the present invention. These may include for example alkoxy silanes such as aminoalkylalkoxy silanes, epoxyalkylalkoxy silanes, for example, 3-glycidoxypropyltrimethoxysilane and, mercapto-alkylalkoxy silanes and γ-aminopropyl triethoxysilane, reaction products of ethylenediamine with silylacrylates. Isocyanurates containing silicon groups such as 1,3,5-tris(trialkoxysilylalkyl) isocyanurates may additionally be used. Further suitable adhesion promoters are reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyl-trimethoxysilane. epoxyalkylalkoxy silane, mercaptoalkylalkoxy silane, and derivatives thereof. Typically adhesion promoters are present in an amount of from 0 to 3% by weight of the total composition. When present in an amount of from 0.01 to 3% weight of the total composition.

Any suitable Fungicides and biocides may be utilised, examples include 2 (4-Thiazolyl)-benzimidazol, n (Fluordichlormethylthio) phthalimid, Diiodomethyl p tolylsulfon, if necessary in compound with a UV stabiliser like e.g. 2,6-di-tert-butyl-p-kresol, 3-iodo-2-propinylbutylcarbamat (IPBC), if necessary in compound with a UV stabiliser like e.g. 2,6-di-tert-butyl-p-kresol, zinc-2-pyridinethiol-1-oxid and Benzothiophen-2-cyclohexylcarboxamid-S, S-dioxide, as well as Isothiazolinones such as 4,5-Dichloro-2-n-octyl-4-isothiazolin-3-on (DCOIT), 2-n-Octyl-4-isothiazolin-3-on (OIT) and n-Butyl-1,2-benzisothiazolin-3-on (BBIT), in particular 2-n-Octyl-4-isothiazolin-3-on (OIT) and 4,5-Dichloro-2-n-octyl-4-isothiazolin-3-on (DCOIT). Other fungicides may include carbamates N-substituted benzimidazole carbamate, benzimidazolylcarbamates10, 10'-oxybisphenoxarsine (trade name: Vinyzene, OBPA), di-iodomethyl-para-tolylsulfone, benzothiophene-2-cyclohexylcarboxamide-S,S-dioxide, N-(fluordichloridemethylthio)phthalimide (trade names: Fluor-Folper, Preventol A3). Methyl-benzimideazol-2-ylcarbamate (trade names: Carbendazim, Preventol BCM), Zinc-bis(2-pyridylthio-1-oxide) (zinc pyrithion) 2-(4-thiazolyl)-benzimidazol, N-phenyl-iodpropargylcarbamate, N-octyl-4-isothiazolin-3-on, 4,5-dichloride-2-n-octyl-4-isothiazolin-3-on, N-butyl-1,2-benzisothiazolin-3-on and/or Triazolyl-compounds, such as tebuconazol in combination with zeolites containing silver.

The moisture curable composition in accordance with the first aspect of the invention may be prepared by mixing the constituents in any suitable order. The compositions can be prepared by mixing the ingredients employing any suitable mixing equipment. Other components may be added as necessary. For example preferred one part, moisture curable compositions may be made by mixing together the extended polysiloxane having hydroxyl or hydrolysable groups and any organosilicon plasticizer or filler used, and mixing this with a pre-mix of the crosslinker and catalyst. UV-stabilisers pigments and other additives may be added to the mixture at any desired stage.

After mixing, the compositions may be stored under substantially anhydrous conditions, for example in sealed containers, until required for use. Compositions herein are stable in storage but cure on exposure to atmospheric moisture.

Whilst compositions according to the invention are preferably formulated as one part formulations which are stable in storage but cure on exposure to atmospheric moisture, a major advantage over several prior art products. However, the composition may also be provided in two parts which are intermixed shortly before application and subsequent cure.

The enhanced speed of obtaining a sufficient green strength enables, in turn, faster product assembly and therefore shorter production cycles when the sealant is being used in a production line type situation and is effectively one of the major time determining steps. The rapid "solidification" which occurs also reduces or eliminates sealant "squeeze out" i.e. the pushing out of sealant from a joint upon the introduction of e.g. a piece of glass or the like into a joint to which the glass is to be sealed and adhered by the sealant. "Squeeze out" of sealants in production lines often leads to the need for additional cleaning after product assembly. Excellent & durable adhesion was obtained on substrates such as glass, aluminium, PVC, Polycarbonate, Polypropylene (flame treated or untreated) and other plastic substrates.

In a further embodiment of the invention there is provided method of forming an elastomeric mass between surfaces which elastomeric mass is adherent to at least two such surfaces which method comprises introducing between the surfaces, at room temperature a mass of curable composition in accordance with the present invention, capable of cure to an elastomeric body and allowing the mass to cure.

Preferably, the adhesive/sealant is applied on to a substrate at room temperature in the form of a liquid or paste which turns back to a solid immediately providing an immediate green strength to the sealant prior/during condensation curing of the siloxane constituent which in time cures to a permanent solid elastomeric sealant/adhesive. The irreversible condensation curing process commences immediately upon contact of the constituents of component a) with the atmosphere/moisture but the majority of the irreversibly curing process of component a will take place at around or slightly above room temperature i.e. at a temperature in the region of from 5 to 35° C. In the case of the present invention whilst the external surface curing of the composition in the presence of moisture occurs in minutes/hours, the hardening of the bulk adhesive and subsequent permanent bonding to the surfaces by condensation curing of the siloxane component throughout the body of the applied adhesive/sealant as described in the present invention takes a few weeks to form but results in a surface which is smooth to the touch unlike traditional air-sealant interfaces which are comparatively tacky or sticky to the touch.

The present invention also extends to an elastomeric product comprising the moisture cured composition and the use of the composition as an adhesive and/or sealant which forms an elastomeric body upon curing.

A further embodiment is a method of forming an elastomeric mass between surfaces which is adherent to at least two such surfaces which method comprises introducing between the surfaces a mass of a moisture curable composition and curing the composition in the presence of moisture.

The composition in accordance with the present invention provides desired cure properties to provide good initial green strength upon initial application and will cure in time upon exposure to moisture to provide a permanently cured, sealed joint between substrates, or other application. The resulting final cured product provides seals of sufficiently low modulus for most industry standards and an elongation to break, which is sufficiently high for most industry standards.

The present RTV silicone composition may be prepared by mixing all the ingredients together in amounts as specified to provide a composition which is stable in the absence of moisture and which cures when exposed to moisture. These compositions are preferably prepared by mixing all the ingredients under anhydrous conditions. This means that the amounts of moisture in the ingredients used should be minimized and that the conditions of mixing should minimize the amounts of moisture allowed into the system. Excess moisture may have deleterious effects on the composition, such as causing curing in the storage package or reduced cured properties.

The present compositions may be prepared as either a one-package system or a two (or multi) package system. With a one-package system all the ingredients are mixed together and stored in an anhydrous state. With a two-or multi-package system the ingredients may be stored separately in any appropriate combination and then mixed prior to use. For convenience, a one-package sealant is preferred. A two part composition may comprise for example, in the first part polymer and filler and in the second part catalyst and cross-linker are provided for mixing in an appropriate ratio (e.g. from 1:1 to 10:1 (wt:wt ratio)) immediately prior to use. The additives may be provided in either the first or second part of the two part composition, providing they do not cause negative effects on the Part concerned during storage. Hence, there is additionally disclosed in a further aspect a multi-pack sealant composition as hereinbefore described comprising a first pack comprising polymer and filler and a second pack comprising catalyst (d) and cross-linker (b) and wherein optional additives are in either or both said first and second packs.

The RTV silicone compositions of this invention have rapid development of green strength upon exposure to moisture and may be used in any application requiring a RTV silicone sealant in addition to applications requiring rapid development of green strength. Hence, the resulting sealant product may be employed in a variety of applications, for example as coating, caulking and encapsulating materials. They are, however, particularly suitable for sealing joints, cavities and other spaces in articles and structures which are subject to relative movement, i.e. as a glazing sealant or sanitary sealant, as sealants for sealing building structures & building materials such as concrete and stone and for use in rainscreen cladding—(replacing mechanical fixations). Other applications include material assembly (e.g. bonding plastic substrates to other plastic materials, plastics to metal surfaces, plastic to glass bonding: such as PVC to glass in windows, metal to metal substrates and glass to glass substrates.

One particularly useful application for compositions as hereinbefore described is as a sealant or adhesive or encapsulant in e.g. assembly line applications, where it is necessary to use a sealant which rapidly develops green strength to allow the sealant user to handle, package and ship the assembled construction after relatively shorter cure times without damage to the assembled construction. Examples include, but are not restricted to, use as an adhesive and/or encapsulant and/or sealant for:

photovoltaic (solar) panels i.e. for use to assemble panels, frames and for junction box bonding adhesive;
for automotive parts such as windscreens and headlamps;
panel assembly in the construction industry e.g. for the adhesion of ceramic tiles and plasterboards etc.
electronic assembly to attach covers to printed circuit boards.

In order that the scope of the invention may become clearer there now follows a description of example sealant compositions selected for description to illustrate the invention by way of example. In the description all compositions are expressed by weight % and all viscosity measurements were made at 25° C. using a Brookfield LV DV-E viscosimeter unless otherwise indicated. In the following examples compositions in accordance with the present invention are compared with a reference material which shows limited green strength.

EXAMPLE 1

Table 1 Formulations of 6 compositions in accordance with the present invention and a reference material with the initial green strength for each composition.

Polymer 1 is a dimethylhydroxy silyl terminated polydimethylsiloxane having a viscosity of 50000 mPa·s at 25° C. Polymer 2 is a dimethylhydroxy silyl terminated polydimethylsiloxane having a viscosity of 13500 mPa·s at 25° C. PCC is a precipitated calcium carbonate which has been treated with a stearic acid and which is commercially available from Solvay SA under the product name Socal 312N. The catalyst used was diisopropoxytitanium Bis (Ethylacetoacetate) and the cross-linker used was methyltrimethoxysilane. The catalyst and cross-linker were added into the composition having been pre-mixed together. The optional plasticiser used was a trimethyl silyl terminated polydimethylsiloxane having a viscosity of 100 mPa·s at 25° C. The optional Extender was a hydrotreated middle petroleum distillate marketed under the Trade name Pilot 900 and sold by e.g. Petrochem Carless BVBA. The optional rheology modifier used in composition C was a polyethyleneoxidepropylene oxide and in formulation D was a fumed silica sold by Cabot Corporation under the Trade Name LM150 and in composition F was a carboxylated liquid polybutadiene.

The value for Green strength (1 min.) (i.e. initial green strength) given in Table 1 is defined as the maximum resistance to constant stress 1 minute after sealant/adhesive application (2 mm thick lap shear) Green strength is measured by making a polycarbonate "lap shear" by bonding two polycarbonate pieces together and identifying what weight said bonded surface area can retain. The bonded area used in the present examples was 25 mm×30 mm=750 mm$^2$ and the green strength is given in Pa which is the weight in Newtons divided by the surface area in m$^2$. So, if the bonded polycarbonate assembly with a 750 mm$^2$ (0.00075 m$^2$) bonded surface area can hold a constant weight of 100 g (1 Newton) for 10 minutes or more, it has a green strength of (1/0.00075) i.e. 1330 Pa.

It will be appreciated from the green strength results depicted in Table 1 that the composition as described herein provide from 3 to greater than 5 times the initial green strength of the reference sealant formulation.

All the compositions depicted in Table 1 gave acceptable cured sealants when cured but for the sake of example composition F is compared to the results of the Reference sample for cure, mechanical and adhesion properties.

TABLE 1

|  | Ref | A | B | C | D | E | F | G |
| --- | --- | --- | --- | --- | --- | --- | --- | --- |
| Components (%) | | | | | | | | |
| Polymer 1 | 39 | 31.5 | | | | | | |
| Polymer 2 | | | 31.5 | 30.3 | 34 | 28.3 | 28.5 | 30.5 |
| PCC | 48 | 56.8 | 56.8 | 59 | 54 | 62 | 60 | 59 |
| Catalyst | 1.0 | 1.0 | 1.0 | 1.0 | 1.0 | 1.0 | 1.0 | 1.0 |
| Cross-linker | 2.7 | 3.2 | 3.2 | 3.2 | 3.0 | 3.2 | 3.35 | 3.2 |
| Rheology modifier | 0 | 0 | 0 | 0.4 | 1.0 | 0 | 0.55 | 0 |
| Plasticiser | 9.3 | 7.5 | 7.5 | 6.1 | 7 | 5.5 | 6.6 | 0 |
| Extender | | | | | | | | 6.3 |
| Properties | | | | | | | | |
| Green strength (1 min.) (Pa) | <250 | 750 | 750 | 1250 | 600 | 1500 | 1500 | 400 |

TABLE 2

| Cure properties | F | Ref |
|---|---|---|
| Tack Free Time (min) (ASTM D2377-94) | 15 | 30 |
| Green strength (Pa) (2 hrs) | >15000 Pa | >15000 Pa |
| Cure in depth (24 hrs) | 2 mm | 2.5 mm |

Green strength (2 hrs) is defined as maximum resistance to constant stress 2 hours after sealant/adhesive application and is measured in the same manner as initial tack free time. It will be noted that after the two hour period the strength values of the example and the reference are about the same. The cure in depth tests were undertaken to determine how far below the surface the sealant had hardened in 24 hours by filling a suitable container (avoiding the introduction of air pockets) with sealant, curing the sealant contained in the container for the appropriate period of time at room temperature (i.e. 23-25° C.) and approximately 50% relative humidity. After the appropriate curing time the sample is removed from the container and the height of the cured sample is measured. The values are similar.

Mechanical properties of the composition F and Reference sample were undertaken using the test methods indicated and the results are depicted in Table 3 (with all Tensile strength and Elongation at break measurements made using the test method first indicated). The samples were cured for a period of 3 weeks at room temperature and their properties were thereafter analysed.

TABLE 3

| Mechanical Properties | | |
|---|---|---|
| Properties | F | REF |
| Sheet | | |
| Tensile Strength (MPa) (ASTM D412-98a) | 1.5-1.8 | 2.2 |
| Elongation at Break (%) (ASTM D412-98a) | 150-200 | 400 |
| Modulus 100% (MPa) (ASTM D638-97) | 1.2-1.5 | 0.8 |
| H-bar shaped samples(GI/GI) & AA/AA (ISO 8339) | | |
| Tensile Strength (MPa) | 0.9-1.0 | 1.2 |
| Elongation (%) | 40-80% | 200% |
| % Cohesive Failure | 100% | 100% |
| Lap shear (PC/PC) (ASTM 3163) | | |
| Tensile Strength (MPa) | 1.0-1.5 MPa | 2.0 MPa |
| Elongation (%) | +/−300% | >450% |
| Peel Test (ASTM D903) % Cohesive Failure | 100% | 100% |
| Duro (Sh A) (ASTM D2240-97) | 57 | 37 |

It will be noted that whilst composition F had a slightly inferior tensile strength compared to the values seen for the reference composition but much higher modulus and lower movement capability (12.5% vs. 50% for Ref).

ADHESION PROPERTIES

The peel test referred to above (ASTM D903) required a tape to be applied to several different surfaces for 7 days at room temperature before being removed. The surfaces used in this instance were wood glass polyvinyl chloride (PVC) and polymethylmethacrylate (PMMA) and in each case the result of the test gave 100% cohesive failure for both composition F and the Ref.

The invention claimed is:

1. A room temperature curable organopolysiloxane composition which has strength in an uncured state of at least 600 Pa measured after one minute, the composition consisting essentially of:
   a) from 20 to 45% by weight of an organopolysiloxane polymer having a viscosity of at least 1000 mPa·s at 25° C. and not less than two silicon-bonded hydroxyl groups and/or silicon bonded hydrolysable groups;
   b) a precipitated calcium carbonate filler;
   c) from 0.1 to 3% by weight of a metal containing condensation catalyst;
   d) from 1 to 10% by weight of a cross-linker adapted to react with component (a), catalysed with component (c);
   e) one or more rheology modifiers;
   f) 0 to 10% by weight of the composition of one or more extenders or plasticisers; and
      wherein component e) is chosen from silicone organic co-polymers based on polyols of polyethers or polyesters, polyethylene glycol, polypropylene glycol, ethoxylated castor oil, oleic acid ethoxylate, alkylphenol ethoxylates, copolymers of ethylene oxide (EO) and propylene oxide (PO), silicone polyether copolymers, carboxylated liquid polyolefins, carboxylated liquid butadienes, silicone glycols, and fumed silica, and
      wherein component b) is present in an amount of from 65 to 75% by weight of the total composition.

2. An organopolysiloxane composition in accordance with claim 1 wherein component a has the general formula:

$$X\text{-}A\text{-}X^1$$

where X and $X^1$ are independently selected from siloxane groups which terminate in hydroxyl or hydrolysable groups and A is a siloxane containing polymeric chain, the hydroxyl-terminating or hydrolysable groups X or $X^1$ being selected from —Si(OH)$_3$, —(R$^a$)Si(OH)$_2$, —(R$^a$)$_2$SiOH, —R$^a$Si(OR$^b$)$_2$, —Si(OR$^b$)$_3$, —(R$^a$)$_2$Si-OR$^b$ or —(R$^a$)$_2$Si—R$^c$—Si (R$^d$)$_p$(OR$^b$)$_{3-p}$ where each R$^a$ independently represents a monovalent hydrocarbyl group; each R$^b$ and R$^d$ group is independently an alkyl or alkoxy group in which the alkyl groups have up to 6 carbon atoms; R$^c$ is a divalent hydrocarbon group which may be interrupted by one or more siloxane spacers having up to six silicon atoms; and p has the value 0, 1 or 2.

3. An organopolysiloxane composition in accordance with claim 2 wherein component (c) is a titanium, tin or zirconium based condensation catalyst.

4. An organopolysiloxane composition in accordance with claim 1 wherein component (b) is a treated precipitated calcium carbonate which has been treated with a treating agent selected from an organochlorosilane, an organopolysiloxane, a hexaalkyldisilazane, a fatty acid or a fatty acid derivative.

5. An organopolysiloxane composition in accordance with claim 4 wherein component (c) is a titanium, tin or zirconium based condensation catalyst.

6. An organopolysiloxane composition in accordance with claim 1 which is room temperature applicable.

7. A method of forming an elastomeric mass between surfaces which is adherent to at least two such surfaces wherein the method comprises introducing between the surfaces, a mass of a curable composition in accordance with claim 1, capable of cure to an elastomeric body and curing the composition in the presence of moisture.

8. A method in accordance with claim 7 in which the mass of curable composition is introduced between the surfaces at room temperature.

9. A cured elastomeric product obtained from the composition in accordance with claim 1.

10. A cured elastomeric product in accordance with claim 9 wherein the elastomeric product is a joint sealant, an adhesive, a molded body, a coating, or a formed-in-place gasket.

11. A sealant or adhesive comprising the composition in accordance with claim 1.

12. A glazing structure or building unit which includes a sealant derived from a composition according to claim 1.

13. A solar panel which includes a sealant derived from a composition according to claim 1.

14. A photovoltaic panel, windscreen, headlamp or printed circuit board which includes a sealant derived from a composition according to claim 1.

15. An organopolysiloxane composition in accordance with claim 1 wherein said metal containing condensation catalyst comprises a metal chosen from tin, lead, antimony, iron, cadmium, barium, manganese, zinc, chromium, cobalt, nickel, aluminium, gallium, germanium and zirconium.

16. An organopolysiloxane composition in accordance with claim 1
wherein said metal containing condensation catalyst is a titanium, tin or zirconium based condensation catalyst.

17. An organopolysiloxane composition in accordance with claim 1
wherein said metal containing condensation catalyst has the general formula:

$$Ti[OR]_4$$

wherein each R is independently a monovalent, primary, secondary or tertiary aliphatic hydrocarbon group which is linear or branched and has from 1 to 10 carbon atoms.

18. An organopolysiloxane composition in accordance with claim 1 having strength in an uncured state of at least 1250 Pa measured after one minute.

19. An organopolysiloxane composition in accordance with claim 1 having strength in an uncured state of at least 1500 Pa measured after one minute.

* * * * *